United States Patent [19]

Kawashima

[11] Patent Number: 5,093,754

[45] Date of Patent: Mar. 3, 1992

[54] CONTROL SYSTEM FOR A MAGNETIC LEVITATION BODY

[75] Inventor: Toshiaki Kawashima, Narashino, Japan

[73] Assignee: Seiko Seiki Kabushiki Kaisha, Japan

[21] Appl. No.: 421,179

[22] Filed: Oct. 13, 1989

[30] Foreign Application Priority Data

Oct. 18, 1988 [JP] Japan .................. 63-262360

[51] Int. Cl.⁵ .......................................... H02N 15/00
[52] U.S. Cl. .................................... 361/144; 307/104; 310/90.5
[58] Field of Search ............... 361/139, 143, 144, 146, 361/147; 307/104; 310/90.5

[56] References Cited

U.S. PATENT DOCUMENTS

| | | | |
|---|---|---|---|
| 4,686,404 | 8/1987 | Nakazeki | 310/90.5 |
| 4,795,927 | 1/1989 | Morii et al. | 310/90.5 |
| 4,879,500 | 11/1989 | Kanemitsu | 310/90.5 |
| 4,910,633 | 3/1990 | Quinn | 361/144 |

Primary Examiner—A. D. Pellinen
Assistant Examiner—Jeffrey A. Gaffin
Attorney, Agent, or Firm—Bruce L. Adams; Van C. Wilks

[57] ABSTRACT

A method for controlling an initial position of a magnetically levitated body comprises sensing the position of the levitated body by position sensors and applying exciting currents to electromagnets in response to the sensed position to adjust the position of the body to an initial central position. The sensing step comprises detecting a first limiting position of the body in a first direction and detecting a second limiting position of the body in a second direction opposite the first direction. The applying step comprises calculating a central position from the first and second limiting positions and applying exciting currents to the electromagnets to move the body into the calculated central position. An apparatus for controlling positioning of a magnetically levitated body based on limiting positions is also disclosed.

8 Claims, 2 Drawing Sheets

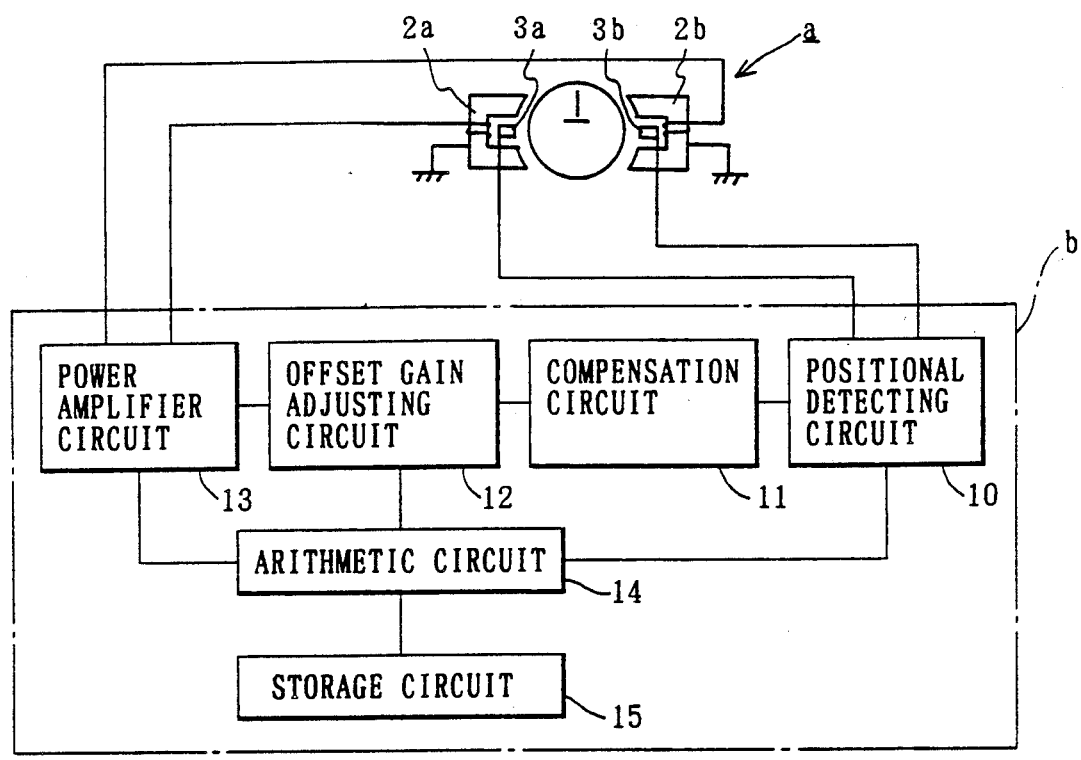

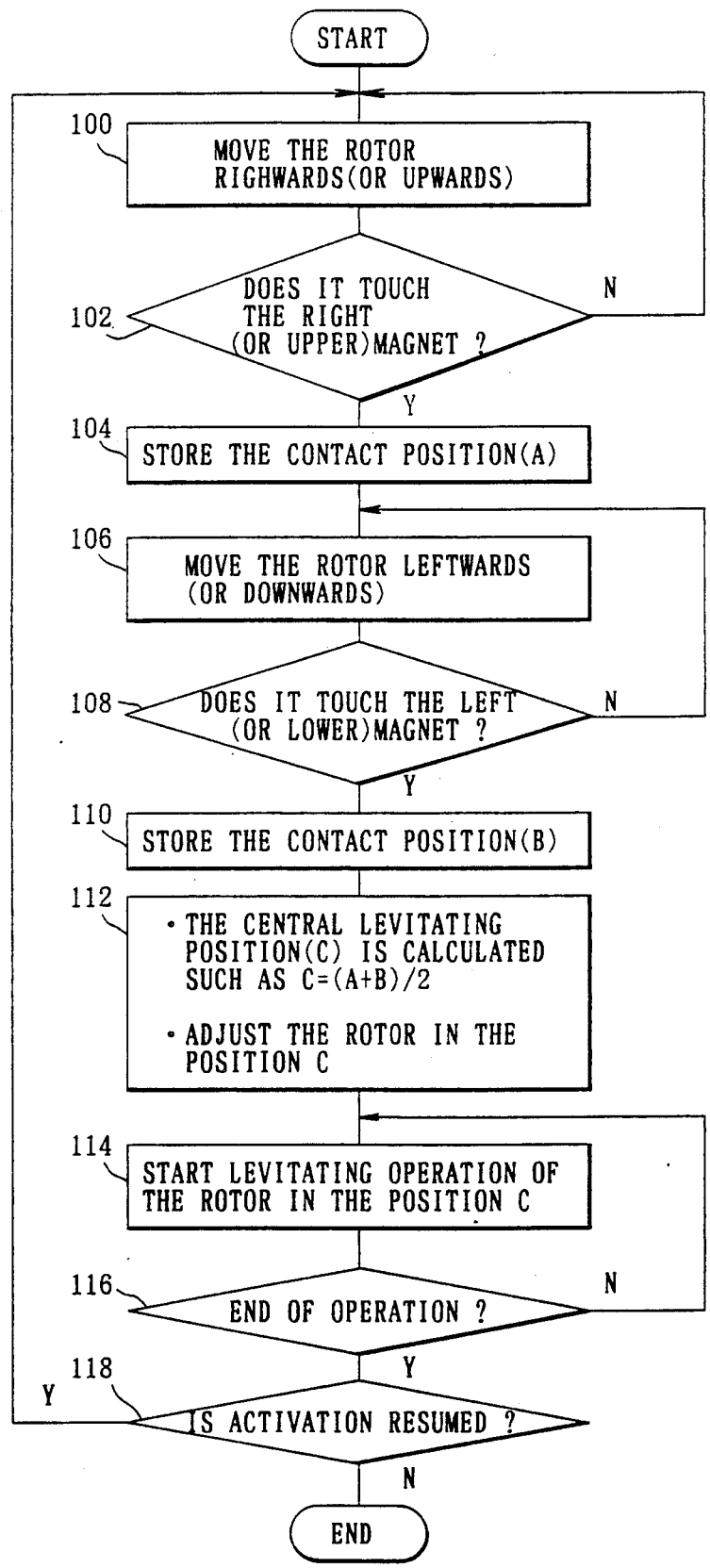

CONTROL SYSTEM FOR A MAGNETIC LEVITATION BODY

BACKGROUND OF THE INVENTION

1. Technical Field of the Invention

The present invention is directed to a control system for a magnetic levitation body such as a rotor of a magnetic bearing type spindle of a machine tool, a rotor of a turbo-molecular pump or a carrier levitation body of a magnetic levitation carrier system, which are all held afloat by magnetic forces.

2. Description of the Related Art

A levitating position of a magnetic levitation body (hereinafter simply referred to as a "levitation body") has heretofore been controlled by feeding back detection signals transmitted from position sensors.

In the case of, e.g., a rotor of a magnetic bearing type spindle, two parts of the rotor in the longitudinal direction are held afloat by magnetic forces of electromagnets, and levitating positions thereof in the radial and axial directions of the rotor are detected by position sensors. Detection signals of the position sensors are processed by a bridge circuit and other processing circuits, and exciting currents of the electromagnets are so controlled that the rotor is held afloat in a predetermined reference target position.

Problems to be Solved by the Invention

The following defects are, however, inherent in the above-described related art control system for a levitation body. Although the system is constructed to hold the levitation body afloat in a predetermined position by the feedback control, costs of production increase when manufacturing the levitation body in conformity with desired dimensions. Generally, there is more or less a scatter in the process of manufacturing the levitation body. The levitation body is not allowed to float in the predetermined target position due to this scatter, thereby making the levitating condition unstable.

Take a rotor of a machine tool for instance, a rotor diameter deviates slightly from a target value, and there are errors in assembly of electromagnets and the like. In such a case, the levitation body can not be levitated in an initially set target position, resulting in an unstable floating condition. This in turn causes inconveniences such as a drop in rigidity.

SUMMARY OF THE INVENTION

According to the present invention which is devised to obviate the foregoing problems, there is provided a control system for a magnetic levitation body, comprising: a magnetic levitation body such as a rotor of a magnetic bearing type spindle of a machine tool, a rotor of a turbo-molecular pump, or a carrier levitation body of a magnetic levitation carrier system, which are all held afloat by electromagnets; position sensors for detecting a levitating position of the magnetic levitation body; and a control means for outputting an exciting current to the electromagnets upon inputting a detection signal detected by the position sensors and making an adjustment of the exciting current of the electromagnets to hold the magnetic levitation body afloat in a predetermined position, characterized by the control means including a detecting circuit for detecting a limit position in a movable range of the magnetic levitation body, and a correction circuit for correcting a target levitating position of the magnetic levitation body by computing a central levitating position from the limit position detected by the detecting circuit.

According to the present invention, the movable limit position of the levitation body is detected by the detecting circuit, and the central levitating position is obtained by the correction circuit on the basis of the detected value thereof. The target levitating position is corrected in accordance with the central levitating position.

BRIEF DESCRIPTION OF THE DRAWINGS

FIG. 1 is a schematic block diagram illustrating a construction of a system of the invention; and FIG. 2 is a flowchart showing controlling operations.

DETAILED DESCRIPTION OF THE INVENTION

One embodiment of the present invention will hereinafter be described with reference to the accompanying drawings.

Turning first to FIG. 1, there is illustrated a schematic block diagram of a construction of a control system of the invention. A levitation body unit a includes a rotor 1 defined as a levitation body. The rotor 1 is held afloat by electromagnets 2a and 2b in the radial directions thereof as well as by unillustrated electromagnets in the axial directions thereof.

Positions of the rotor 1 in the radial and axial directions are detected by radial position sensors 3a and 3b disposed adjacently to the electromagnets 2a and 2b and unillustrated electromagnets for holding the levitation body in the axial directions and by axial position sensors (not illustrated). Detections signals thereof are transmitted to a control means which will be mentioned later. Positional control in the axial directions is effected in the same manner as that in the radial directions, so that the description will be concentrated on the control in the radial directions.

The reference symbol b represents a control means composed of: a position detecting circuit 10 for detecting a radial position of the rotor 1 on the basis of the detection signals detected by the positional sensors 3a and 3b; a compensation circuit 11 for compensating a difference obtained in comparison between a reference signal for determining a target position and a detected position signal; a detecting circuit for detecting a limit of a range in which the rotor 1 is movable to and fro or right and left, i.e., an offset gain adjusting circuit 12 for operating the rotor; a power amplifier circuit 13 for supplying exciting currents to electromagnets 2a and 2b; an arithmetic circuit 14 for computing a central levitating position from the limit value of the movable range of the rotor 1; and a storage circuit 15 for storing the limit value of the movable range preparatory for the above-mentioned arithmetic process.

Control operations of the present embodiment based on this construction will be described with reference to a flowchart of FIG. 2.

When a command for starting an operation of the levitation body unit a is issued from an unillustrated programmable controller to the control means b, the exciting current having a predetermined intensity is supplied from the power amplifier circuit 13, with the result that the rotor 1 is held afloat. Simultaneously, an offset command is given from the arithmetic circuit 14 to the offset gain adjusting circuit 12. Videlicet, the power amplifier circuit 13 consecutively adjusts the exciting currents of the electromagnets 2a and 2b in response to the signals outputted from the offset gain adjusting circuit 12, thereby gradually moving the rotor 1 towards the electromagnet 2b (step 100). A signal based on a value of the exciting current at that time is inputted to the arithmetic circuit 14, and at the same moment a position of the rotor 1 is detected by position detecting circuit 10. The detected position is then inputted to the arithmetic circuit 14. A timing at which the position of the rotor 1 ceases to change even when the exciting current varies implies a position in which the rotor 1 comes in contact with the electromagnet 2b. Therefore, a position (A) at this time is loaded from the arithmetic circuit 14 into the storage circuit 15 (step 102 Yes, 104).

Subsequently, offset commands in the foregoing offset and reversed directions are issued from the arithmetic circuit 14 to the offset gain adjusting circuit 12. Namely, the power amplifier circuit 13 functions to consecutively adjust the exciting currents of the electromagnets 2a and 2b in accordance with the signals outputted from the offset gain adjusting circuit 2, thereby gradually moving the rotor 1 towards the electromagnet 2a. As in the above-mentioned offset, a position (B) of the rotor 1 when touching the electromagnet 2a is stored in the storage circuit 15 (steps 106, 108 Yes, 110).

The arithmetic circuit 14 calculates a central position $(C=(A+B)/2)$ of the positions (A) and (B) which are conceived as right and left movable limit positions. Subsequent to this step, the central position calculated by the arithmetic circuit 14 is outputted to the offset gain adjusting circuit 12 for adjusting the offset so that the rotor 1 is held afloat in the central position serving as a reference target position. At this time a sensor sensitivity parameter $[(A)-(B)]$ is also calculated, and a control gain value corresponding to this sensor sensitivity parameter is output to the offset gain adjusting circuit 12 (step 112), to compensate for any variations between the detected values and the known or actual position values. In other words, since the actual difference (A-B) is known (i.e. since the distance between the electromagnets 2a and 2b is known and the rotor diameter is also know), the sensor sensitivity is adjusted to match the difference detected by the sensor to the actual or known difference, with a control gain value (corresponding to the adjusted sensor sensitivity) output to the offset gain adjusting circuit 12.

Thereafter, the rotor 1 is rotated by an unillustrated induction motor while being held afloat in accordance with the target value (C), thus starting the operation (steps 114, 116 No). The above-described steps are repeated every time activation of the levitation body unit a is resumed (step 118 Yes).

It is, however, possible to omit the foregoing steps by controlling the second and subsequent levitating positions, which involves the use of data stored in the storage circuit 15 when effecting the first activation in the case of the same combination with respect to the levitation body unit and the control means b.

A reference target position in association with the axial position of the rotor 1 is similarly set, though the explanation is omitted.

In this embodiment, as discussed above, the target levitating position of the rotor 1 is computed from the limit position of a vertically and bilaterally movable range. Hence, the target position can invariably be set even when causing a scatter in manufacturing the levitation body unit a. For this reason, the levitation body comes to have a predetermined rigidity.

Note that if, in the foregoing embodiment, the levitating position of the rotor 1 is controlled separately in a parallel mode (i.e. for movement and positioning of the rotor axis in a direction parallel to the rotor axis) and in an oblique mode (i.e. movement and positioning of the rotor axis in a direction oblique to the rotor axis, it is required to obtain the reference position (C) in each mode.

Where the levitating position of the rotor 1 is controlled in a plurality of directions, viz., in the radial and axial directions, the above-mentioned levitation controlling processes are effected in sequence.

In the foregoing embodiment, the rotor is exemplified as a levitation body. As a matter of course, however, the rotor may be replaced with a carrier levitation body of a magnetic levitation carrier system.

Effects of the Invention

As discussed above, in accordance with the present invention, the target levitating position of the levitation body is calculated from the limit position of the vertically and bilaterally movable range. With this arrangement, even when there is a scatter in manufacturing the levitation body unit, the target position can constantly be set with accuracy, thereby providing the magnetic levitation body having a predetermined rigidity.

I claim:

1. A control system for a magnetic levitation body, comprising: a magnetic levitation body which is held afloat by electromagnets; position sensors for detecting a levitating position of said magnetic levitation body; and control means for outputting an exciting current to said electromagnets upon inputting a detection signal detected by said position sensors and making an adjustment of the exciting current of said electromagnets to hold said magnetic levitation body afloat in a predetermined position, said control means including a detecting circuit for detecting a limit position in a movable range of said magnetic levitation body, and a correction circuit for correcting a target levitating position of said magnetic levitation body by computing a central levitating position from said limit position detected by said detecting circuit.

2. A method for controlling the position of a magnetically levitated body comprising the steps of: sensing the position of a levitated body by position sensors; and applying exciting currents to electromagnets in response to the sensed position by the position sensors to adjust the position of the body to a calculated central position; wherein the sensing step comprises detecting a first limiting position of the body in a first direction and detecting a second limiting position of the body in a second direction opposite the first direction, and the step of applying exciting currents to adjust the position comprises calculating a central position from the first and second limiting positions and applying exciting currents to the electromagnets to move the body into the calculated central position.

3. The method according to claim 2, wherein the step of calculating comprises storing the first and second limiting positions and calculating the central position from the stored limiting positions.

4. The method according to claim 2, further comprising calculating the sensitivity of the sensors from the difference between the limiting positions and adjusting the gain between the sensors and the electromagnets in accordance therewith.

5. The method according to claim 2, wherein the step of detecting the first and second limiting positions includes moving the body to said first limiting position, sensing the position and storing the sensed position as the first limiting position; and moving the body to the second limiting position, sensing the position and storing the sensed position as the second limiting position.

6. A system for controlling the position of a magnetically levitated body comprising: means for sensing position of a levitated body; electromagnets for maintaining a position of the body in response to exciting currents applied thereto; and means for adjusting the position of the body in response to the sensed position to adjust the position of the body to a calculated central position, wherein the means for sensing comprises means for detecting a first limiting position of the body in a first direction and means for detecting a second limiting position of the body in a second direction opposite the first direction, and wherein the means for adjusting the position comprises means for calculating a central position from the first and second limiting position and means for applying exciting currents to the electromagnets to move the body into the calculated central position.

7. The method according to claim 6, wherein the means for calculating comprises means for storing the first and second limiting positions and means for calculating the central position from the stored limiting positions.

8. The method according to claim 6, further comprising means for calculating the sensitivity of the sensors from the difference between the limiting positions, and means for adjusting the gain between the sensors and the electromagnets in accordance with the sensitivity.

* * * * *